United States Patent [19]
Sakuyama

[11] Patent Number: 5,729,373
[45] Date of Patent: Mar. 17, 1998

[54] REPRODUCING CIRCUIT OF MONITOR SIGNAL

[75] Inventor: Hiroshi Sakuyama, Tokyo, Japan

[73] Assignee: NEC Corporation, Tokyo, Japan

[21] Appl. No.: 559,556

[22] Filed: Nov. 16, 1995

[30] Foreign Application Priority Data

Nov. 16, 1994 [JP] Japan ................... 6-281683

[51] Int. Cl.⁶ .................................. H04B 10/06
[52] U.S. Cl. ............ 359/189; 359/177; 359/110; 375/317; 250/551
[58] Field of Search .................. 359/110, 161, 359/177, 189, 194; 375/250, 317, 350; 455/226.1; 250/551, 214 UA

[56] References Cited

U.S. PATENT DOCUMENTS

5,291,326 3/1994 Heidemann ............... 359/110
5,485,302 1/1996 Brown et al. .............. 359/189

FOREIGN PATENT DOCUMENTS

63-296415 12/1988 Japan .
4-79525 3/1992 Japan .

OTHER PUBLICATIONS

Haas et al —"Optical Receives Having Continuous Verification Feature", IBM Technical Disclosure Bulletin, vol. 23, NO. 6, Nov. 1980 pp. 2436–2437.

Primary Examiner—Kinfe-Michael Negash
Attorney, Agent, or Firm—Scully, Scott, Murphy & Presser

[57] ABSTRACT

A reproducing circuit is disclosed having a photo-diode for extracting a signal component of a monitor signal from an electric signal converted from an optical signal using a band pass filter 108 and an envelope detector circuit 111. The output of the photo-diode 106 is smoothed by a capacitor 12 via a buffer amplifier 11. A threshold voltage control circuit 13 converts the smoothed signal voltage with a predetermined ratio to produce a threshold voltage. A discriminator 115 converts the extracted monitor signal component into a binary signal using the threshold voltage as a reference. Since the smoothed voltage varies in accordance with the average intensity of optical signal, the monitor signal can be appropriately converted into a binary signal in accordance with the intensity of optical signal. Further, since the smoothing is performed by a capacitor, the circuit structure can be simplified.

5 Claims, 5 Drawing Sheets

REPRODUCING CIRCUIT OF MONITOR SIGNAL

BACKGROUND OF THE INVENTION

The present invention relates to a circuit for extracting and reproducing a monitor signal component superimposed on an optical signal, and more particularly, to a circuit for converting the extracted monitor signal component into a binary signal and reproducing it.

In a long distance optical communication system, an optical signal, on which a predetermined monitor signal is superimposed, is transmitted for monitoring faults generated while traveling along the transmission path. A relay station of the optical signal and a receiving station checks the normal transmission state by extracting the component of the monitor signal and monitoring it.

A conventional monitor signal reproducing circuit includes a branching circuit for branching a part of the received optical signal, as described later. After the branched optical signal is converted into an electric signal, only a frequency component of the monitor signal is extracted. Small variations of the extracted monitor signal component are removed by an envelope detector. The output of the envelope detector is compared with a threshold voltage signal having a predetermined voltage by a discriminator, and the output of the discriminator is output as a binary signal.

However, in the above reproducing circuit, since the threshold voltage is fixed to the predetermined value, there is a problem in that the monitor signal component can not be converted into a binary signal and reproduced if the amplitude of a main signal of the optical signal is changed. In order to solve this, a circuit is known in which the voltage of the threshold voltage signal is changed in response to the amplitude of a signal to be compared. A Laid-open Japanese patent application No. 63-296415reference 1), for example, a technique is disclosed in which a peak value of an analog signal to be compared is detected and the threshold voltage is changed based on the detected peak value. The analog signal can be converted into a binary signal in accordance with the peak value, and the degradation a signal-noise ratio can be prevented in a small signal.

On the other hand, in another Laid-open Japanese patent application No.4-79525 (reference 2), a light receiving circuit is disclosed in which an erroneous operation due to a noise is prevented when no input signal is provided. In the light receiving circuit, after a small voltage, which is slightly higher than a noise level, is added to a divided value of an input signal, the peak value thereof is held and provided to a comparator as a threshold value. Even if there is no input signal, an erroneous operation due to noise can be prevented because the small voltage, which higher than the noise level, is used as the threshold voltage.

However, the circuits described in references 1 and 2 are complex, since they require a peak detecting circuit.

SUMMARY OF THE INVENTION

An object of the present invention is to provide a reproducing circuit of a monitor signal having a simplified circuit structure in which the above problems are solved.

A reproducing circuit of the present invention includes an optoelectric convertor for receiving an optical signal in which a predetermined monitor signal is superimposed. The optoelectric converter outputs an electric signal having an amplitude in correspondence to an intensity of the received optical signal. A filter extracts a signal component of the monitor signal from the electric signal provided from the optoelectric convertor. The variation of amplitude of the electric signal output from the optoelectric convertor is smoothed by a smoothing circuit. The signal extracted by the filter is converted into a binary signal by a binary signal producing circuit using the magnitude of amplitude of the smoothed signal as a threshold value.

That is, the threshold voltage is produced by smoothing the output of the optoelectric convertor. Since the amplitude of smoothed signal varies in accordance with the average intensity of received optical signal, the monitor signal can be appropriately converted into a binary signal in accordance with the intensity of optical signal.

BRIEF DESCRIPTION OF THE DRAWINGS

The above and other objects, features and advantages of the present invention will become apparent from the following detailed description when taken with the accompanying drawings in which.

Detailed Description of the Preferred Embodiments

Figure 1:
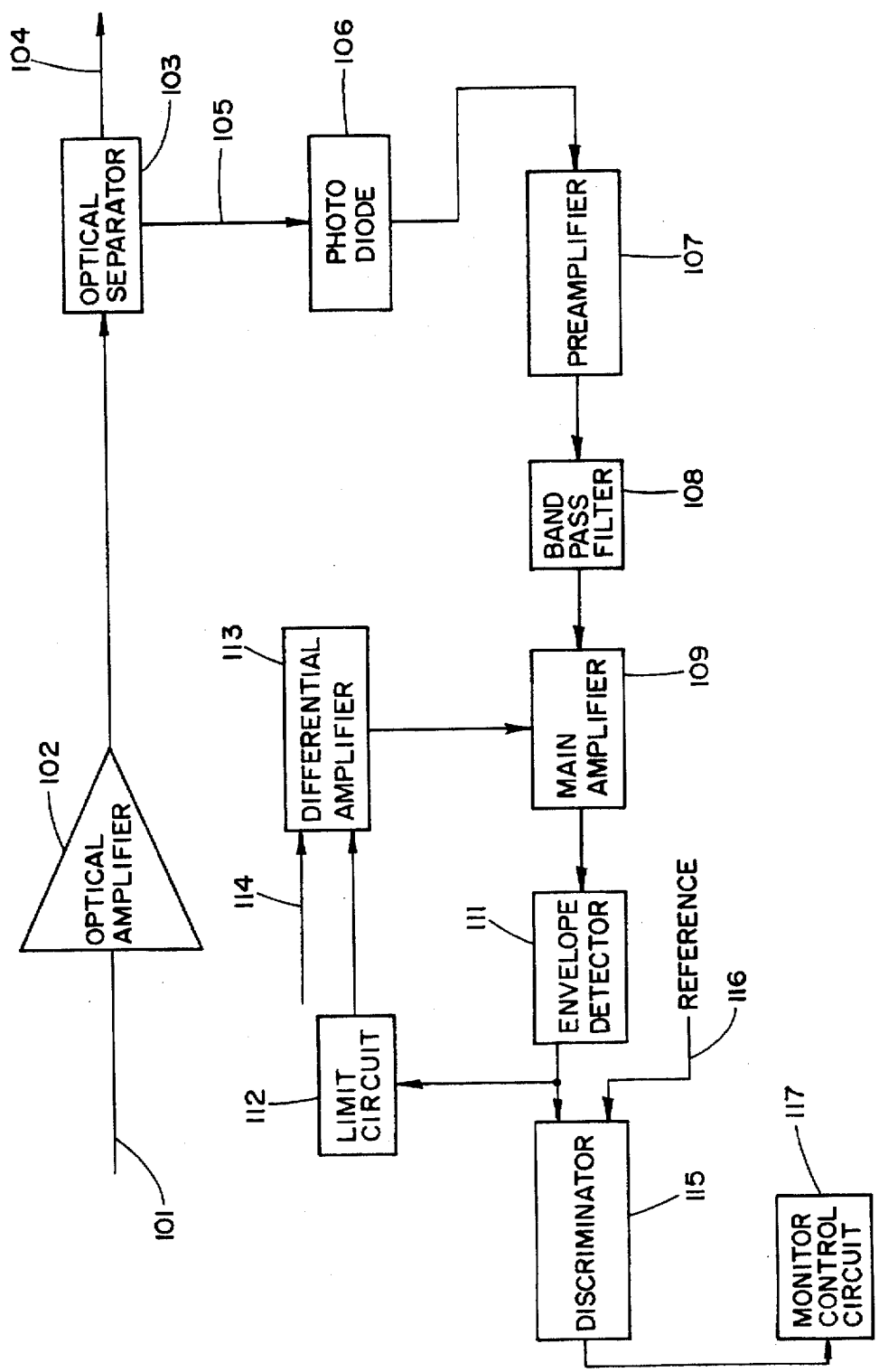
FIG. 1 is a block diagram of a conventional reproducing circuit of a monitor signal.

In order to easily understand the present invention, a conventional reproducing circuit will be described with reference to FIG. 1. In the figure, an optical signal 101 transmitted via an optical fiber is input to an optical amplifier 102. The optical signal, which is amplified by the optical amplifier 102, is input to an optical separator 103 such that the optical signal is separated into an output optical signal 104 and a monitor optical signal 105. The monitor optical signal 105 is input to a photo-diode 106 for converting the monitor optical signal into an electric signal in accordance with the intensity of monitor optical signal. The output signal of the photo-diode 106 is input via a preamplifier 107 to a band pass filter 108 for extracting only the frequency component of the monitor signal, hereinafter referred to as a monitor signal component. The output of the band pass filter 108 is amplified by a main amplifier 109 and then input to an envelope detector 111. The envelope detector 111 removes small variation of the extracted monitor signal component.

The output of the envelope detector 111 is input to a differential amplifier 113 via a limit circuit 112 for limiting the maximum amplitude. A gain control reference signal 114 of a predetermined voltage is input to the differential amplifier 113, and a gain control signal, which is determined based on the difference between the gain control reference signal 114 and the output of the limit circuit 112, is fed back to the main amplifier 109. The output of the envelope detector 111 is also provided to a discriminator 115. Also in addition, a threshold voltage 116 of a predetermined voltage is input to the discriminator 115 and is compared with the output of the envelope detector 111. The output of discriminator 115 is a binary signal. The output of the discriminator 115 is provided to a monitor control circuit 117. The monitor control circuit 117 monitors whether the output of the discriminator 115 changes periodically and displays the abnormal state of an optical signal when the output of the discriminator 115 is constant over a predetermined time period.

In the reproducing circuit shown in FIG. 1, as described above, since the threshold voltage 116 is constant the monitor signal component can not be converted into a binary signal and reproduced if the amplitude of the main signal of the optical signal changes.

Figure 2A:
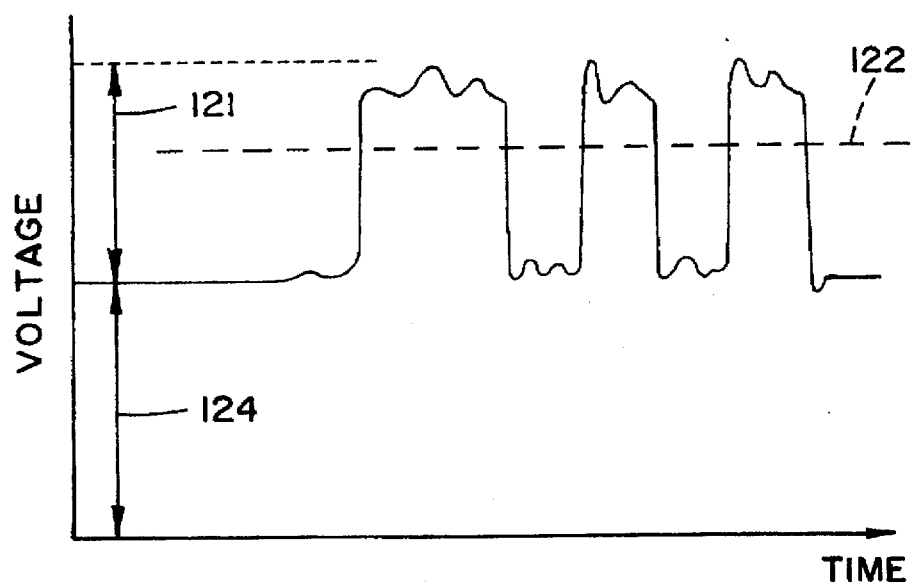
FIGS. 2A and 2B are diagrams illustrating relations between a threshold value and signal waveforms input to a discriminator of the reproducing circuit of FIG. 1.
Figure 2B:
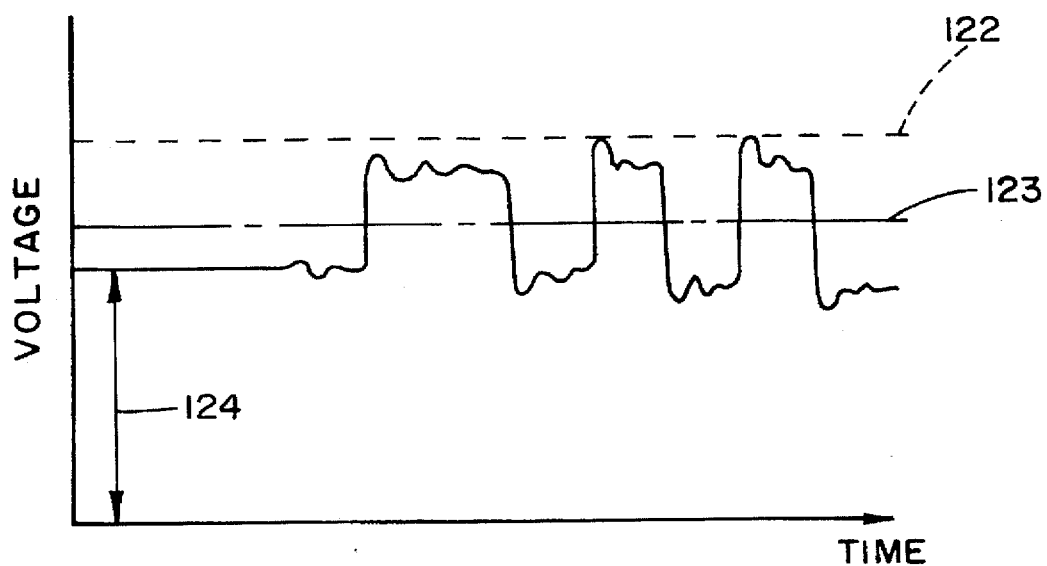

This will be described with reference to FIGS. 2A and 2B which illustrate the relationship between the threshold voltage 116 and signal waveforms input to the discriminator 115. When the optical signal has a large great intensity (FIG. 2A), the amplitude of the main signal is also large and thereby the amplitude 121 of the monitor signal component is also great. The threshold voltage 122 for converting the signal into an appropriate binary signal is located on the center portion of the amplitude of the monitor signal component. When the received optical signal has a small intensity (FIG. 2B), the amplitude of the main signal is small and thereby the amplitude of the monitor signal component is also small. For this reason, an appropriate binary signal converting operation can not be executed using the threshold voltage 122 which is set in accordance with a light having strong intensity. On the contrary, with a threshold voltage 123 set in accordance with an optical signal having a weak intensity, there is a case where a noise component of the amplitude 124 of the main signal exceeds the threshold voltage 123 when the intensity of optical signal becomes strong. In this manner, in a case that the threshold voltage is fixed to a constant value, there is a problem in that the reproduction of the monitor signal component can not be accurately executed when the intensity of optical signal changes.

Figure 3:
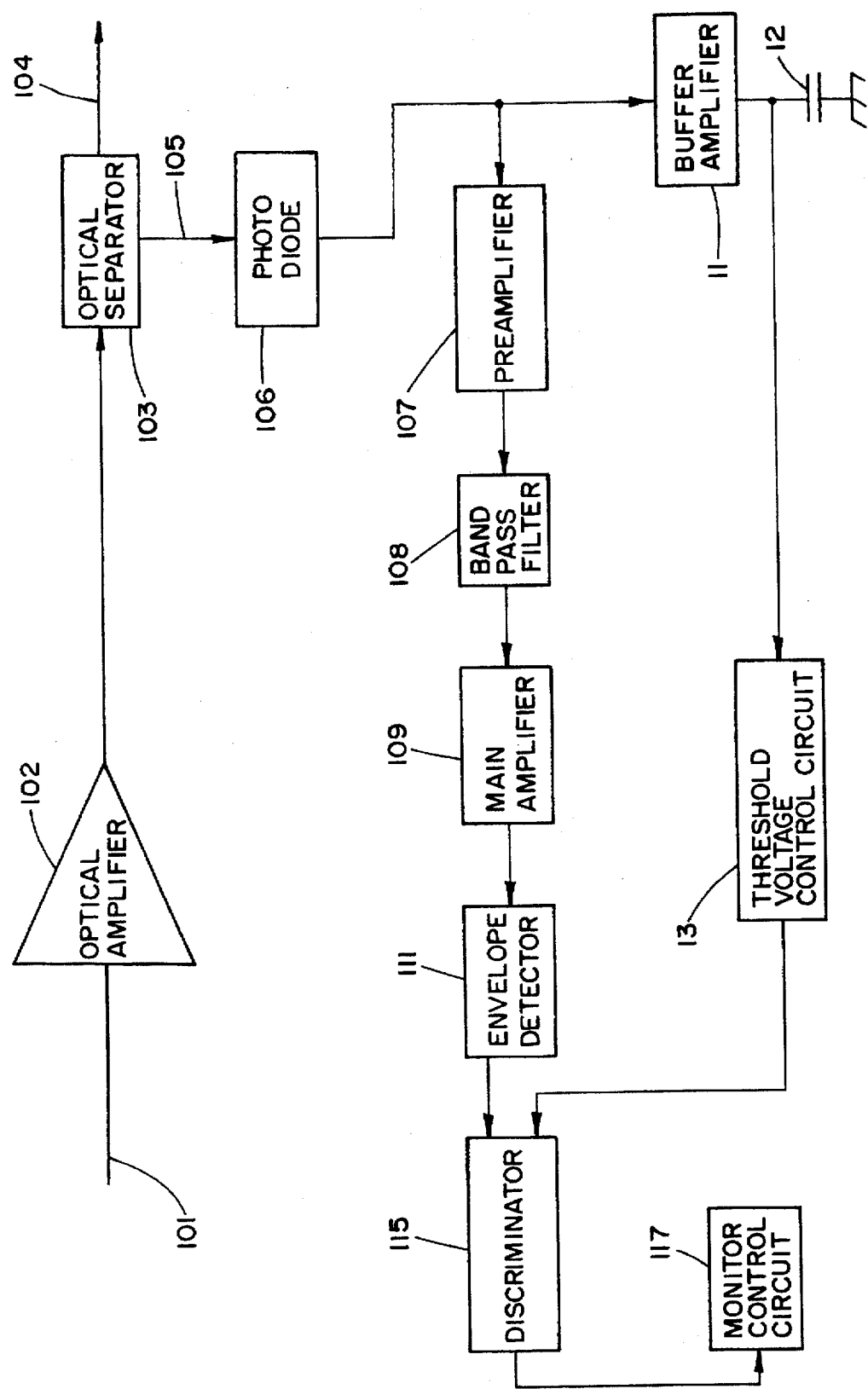
FIG 3 is a block diagram of an embodiment of the present invention.

FIG. 3 shows the reproducing circuit according to an embodiment of the present invention. The same circuit portions as shown in FIG. 1 are assigned with the same reference numerals and the description thereof is omitted. In this reproducing circuit, the output of the photo-diode 106 is connected via a buffer amplifier 11 to a capacitor 12 whose one terminal is connected to ground. Due to the buffer amplifier 11, a signal input to the preamplifier 107 is not influenced by the capacitor 12. A connection node between the buffer amplifier 11 and the capacitor 12 is connected to a threshold voltage control circuit 13.

Figure 4:
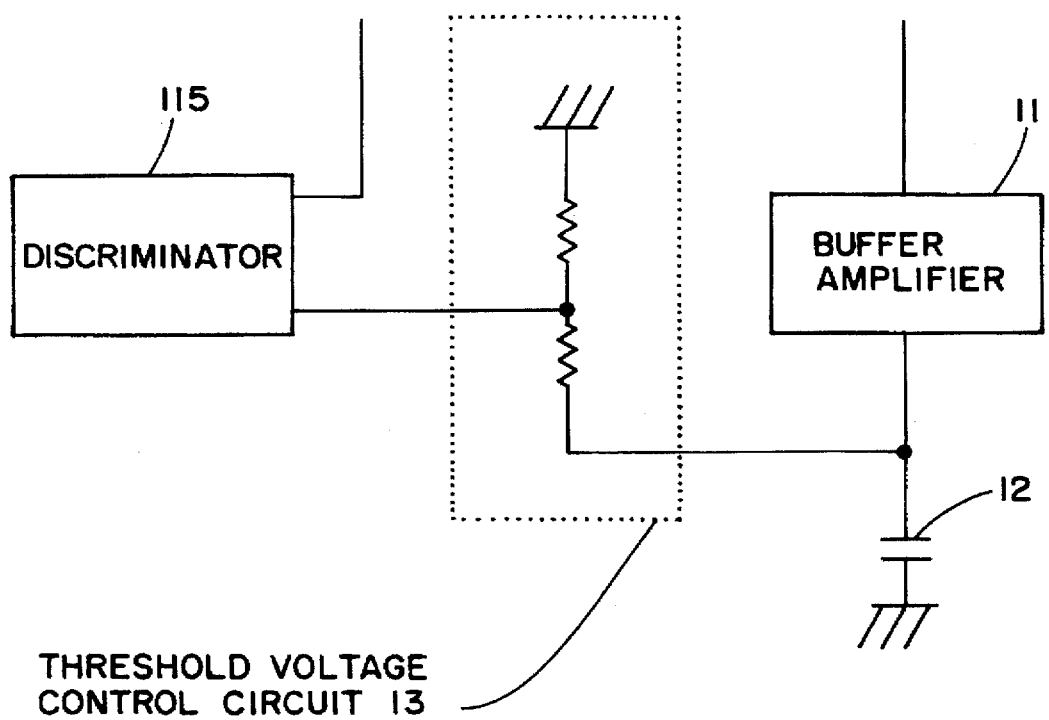
FIG. 4 is a circuit diagram of an example of a threshold voltage generating circuit.

The capacitor 12 functions to smooth the variation of the output voltage of the photo-diode 106. The threshold voltage control circuit 13 generates the threshold voltage based on the smoothed voltage signal. This circuit may be constructed by a voltage dividing resistor circuit for dividing the voltage signal with an appropriate dividing ratio. More particularly, the circuit may be constructed of the voltage dividing resistor circuit shown in FIG. 4.

FIGS. 5A to 5D show an example of signal waveforms in various portions of the reproducing circuit shown in FIG. 3. In the output waveform of the preamplifier 107 shown FIG. 5A, the monitor signal component 22 is superimposed on the main signal component. When the value of the monitor signal is "0", only the main signal component is remained, whereas, when the value as the monitor signal is "1", the main signal is modulated by a carrier signal 22 having a predetermined frequency. When the signal having such a waveform is input to the band pass filter 108, the main signal component having high frequency is removed. Therefore, when the value of monitor signal is "0", the signal waveform 23, shown in FIG. 5B has a constant voltage, whereas, when the value of monitor signal is "1", the signal waveform 24, in which the carrier signal is superimposed on the constant voltage, is obtained.

Figure 5A:
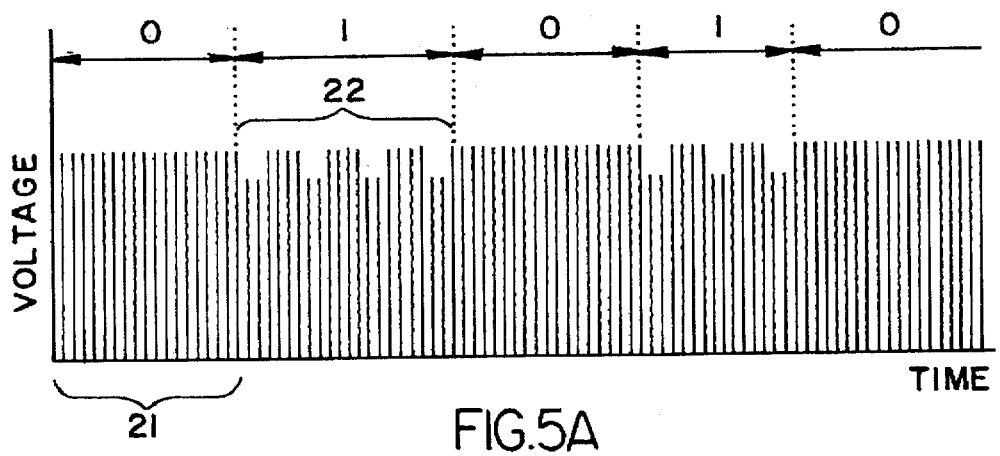
FIGS. 5A to 5D are diagrams illustrating signal waveforms in various sections of FIG. 3.
Figure 5B:
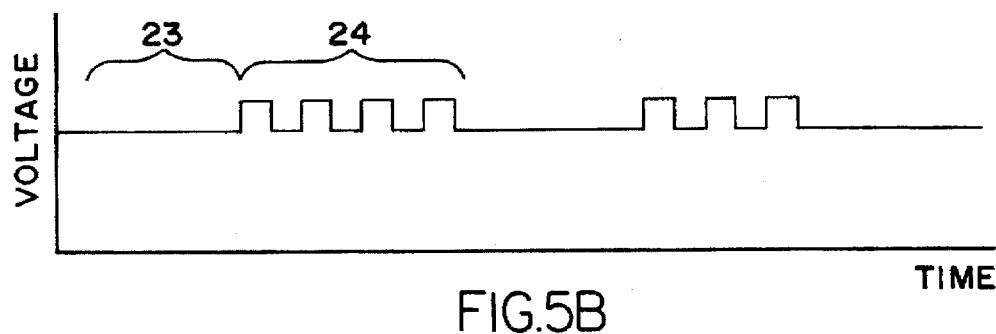
Figure 5C:
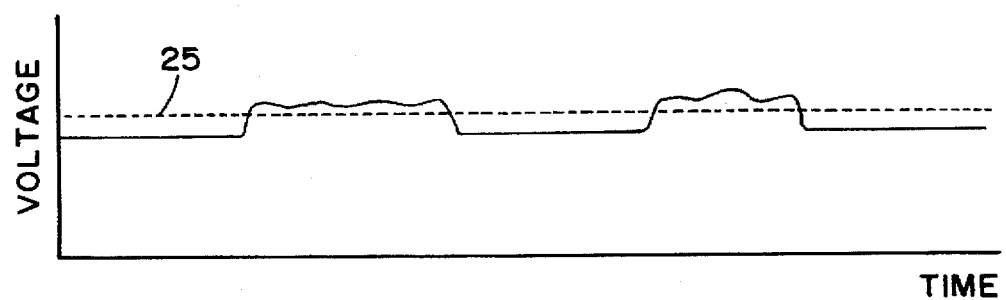
Figure 5D:
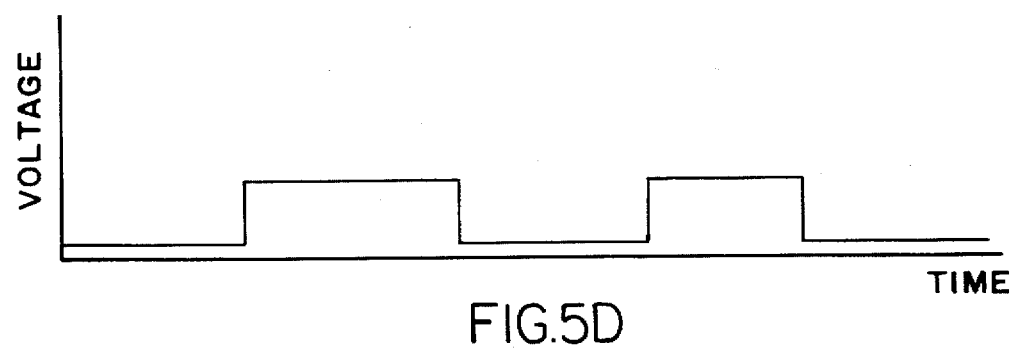

The output of the envelope detector 111, shown in FIG. 5C, has a waveform in which the carrier signal 24, shown in FIG. 5B, is rectified so that pulses are continuous. In this case, if the threshold voltage 25 is set to a voltage as shown in FIG. 5C by a dashed line, the output of the discriminator 115, shown in FIG. 5D has a binary signal waveform in correspondence to "0" or "1" of the monitor signal. If the output signal of the photo-diode 106 is smoothed by the capacitor, a substantially constant voltage can be obtained. Since this threshold voltage 25 varies in response to the intensity of optical signal, the output of the envelope detector 111 can be appropriately converted into a binary signal, if the threshold voltage 25 is divided with an appropriate division ratio to use as a threshold voltage signal. In this example, a time constant of an integrating circuit formed of the capacitor 12 is set to be ten times longer than the period of the carrier signal. Thus, the output of the photo-diode 106 is separated by the buffer amplifier 11 and the amplitude variation due to the carrier signal is removed only from the component of separated signal which is used for generation of the threshold voltage. Therefore, the substantially constant voltage can be obtained as the threshold voltage.

In the embodiments mentioned above, the monitor signal component is obtained by modulating the carrier signal. However, the amplitude of the main signal may be directly modulated by the monitor signal. In this case, the time constant of the integrating circuit formed of the capacitor 12 and the threshold voltage control circuit 13 is sufficiently set to be a large value in corresponding to the period of the monitor signal. Further, it is not necessary to interpose the buffer amplifier 11 between the photo-diode 106 and the capacitor 12. Since it is sufficient that the integrating circuit can be constructed, a resistor may be inserted.

While the present invention has been described in connection with certain preferred embodiments, it is to be understood that the subject mater encompassed by the present invention is not limited to those specific embodiments. On the contrary, it is intended for the subject matter of the present invention to includes all alternatives, modifications and equivalents as can be included within the spirit and the scope of the following claims.

What is claimed is:

1. A reproducing circuit comprising:

optoelectric converting means for receiving an optical signal in which a predetermined monitor signal is superimposed, and for outputting an electric signal having an amplitude in correspondence to an intensity of the received optical signal;

monitor signal component extracting means for extracting said monitor signal from said electric signal output from said optoelectric converting means;

smoothing means for smoothing the variation of amplitude of the electric signal output from said optoelectric converting means; and binary signal producing means for converting the monitor signal extracted by said monitor component extracting means into a binary signal using the amplitude of the smoothed signal as a variable threshold value.

2. A reproducing circuit according to claim 1, wherein said smoothing means is an integrating circuit having a predetermined time constant.

3. A reproducing circuit comprising:

optoelectric converting means for receiving an optical signal in which a predetermined monitor signal is superimposed, and for outputting an electric signal having an amplitude in correspondence to an intensity of the received optical signal;

monitor signal component extracting means for extracting said monitor signal from said electric signal output from said optoelectric converting means;

smoothing means for smoothing the variation of amplitude of the electric signal output from said optoelectric converting means;

threshold voltage generating means for generating a threshold voltage that varies in accordance to the voltage of the smoothed electric signal; and binary signal producing means for converting the monitor signal extracted by said monitor component extracting means into a binary signal using the threshold voltage as a reference.

4. A reproducing circuit according to claim 3, wherein said smoothing means includes a buffer that isolates said smoothing means to prevent smoothing of said electric signal provided to said monitor signal component extracting means.

5. A reproducing circuit according to claim 3, wherein said threshold voltage generating means is composed of a voltage dividing resistor circuit.

* * * * *

UNITED STATES PATENT AND TRADEMARK OFFICE
CERTIFICATE OF CORRECTION

PATENT NO. : 5,729,373
DATED : March 17, 1998
INVENTOR(S) : Hiroshi Sakuyama

It is certified that error appears in the above-identified patent and that said Letters Patent is hereby corrected as shown below:

Column 1, Line 37: "A" should read --In a--

Column 1, Line 38: "63-296415 reference" should read --63-296415 (reference)--

Column 1, Line 43: "a" should read --of a--

Column 1, Line 54: "which higher" should read --which is higher--

Column 3, Line 4: "the" should read --an--

Column 3, Line 15: "large great" should read --large--

Column 3, Line 17: "great" should read --large--

Column 3, Line 58-59: "shown FIG. 5A" should read --shown in FIG. 5A--

Column 4, Line 10: "5D" should read --5D.--

Signed and Sealed this

Thirty-first Day of October, 2000

Attest:

Q. TODD DICKINSON

*Attesting Officer*  *Director of Patents and Trademarks*